(12) United States Patent
Neal et al.

(10) Patent No.: US 7,237,187 B2
(45) Date of Patent: Jun. 26, 2007

(54) INTERACTIVELY COMPARING RECORDS IN A DATABASE

(75) Inventors: Michael Renn Neal, Superior, CO (US); James Michael Wilmsen, Westminster, CO (US)

(73) Assignee: Requisite Technology, Inc., Westminster, CO (US)

( * ) Notice: Subject to any disclaimer, the term of this patent is extended or adjusted under 35 U.S.C. 154(b) by 405 days.

(21) Appl. No.: 10/062,340

(22) Filed: Jan. 31, 2002

(65) Prior Publication Data
US 2003/0145277 A1    Jul. 31, 2003

(51) Int. Cl.
*G06F 17/00* (2006.01)
(52) U.S. Cl. ................. 715/509; 715/513; 707/101
(58) Field of Classification Search ........... 715/509, 715/503, 505, 513; 707/101, 2, 7; 705/27, 705/35
See application file for complete search history.

(56) References Cited

U.S. PATENT DOCUMENTS

| | | | | |
|---|---|---|---|---|
| 5,317,686 A | * | 5/1994 | Salas et al. ............... 715/503 |
| 5,359,729 A | * | 10/1994 | Yarnell et al. ............. 707/2 |
| 5,553,218 A | * | 9/1996 | Li et al. .................... 707/102 |
| 5,740,425 A | | 4/1998 | Povilus ...................... 395/611 |
| 5,765,005 A | * | 6/1998 | Maruoka et al. .......... 715/505 |
| 5,787,411 A | * | 7/1998 | Groff et al. ................ 707/2 |
| 5,832,459 A | | 11/1998 | Cameron et al. .......... 705/26 |
| 5,884,306 A | * | 3/1999 | Bliss et al. ................ 707/7 |
| 5,897,639 A | | 4/1999 | Greef et al. ............... 707/103 |
| 5,914,718 A | * | 6/1999 | Chiu et al. ................ 715/863 |

(Continued)

FOREIGN PATENT DOCUMENTS

GB    2355554 A    4/2001

(Continued)

OTHER PUBLICATIONS

Courter et al., "Mastering Microsoft Office 2000, Professional Edition", Apr. 1999, Sybex, pp. 1058-1062.*

(Continued)

*Primary Examiner*—Heather R. Herndon
*Assistant Examiner*—James H Blackwell
(74) *Attorney, Agent, or Firm*—Christopher J. Kulish, Esq.; Holland & Hart LLP

(57) ABSTRACT

The present invention can allow an electronic catalog or other set of items to be searched and compared interactively. In one embodiment, the invention includes displaying a list of items in an electronic catalog, each item corresponding to a row of the display, each row having values corresponding to attributes of the corresponding items arranged into attribute columns, grouping some of the displayed items based on a selected attribute upon receiving a grouping command so that the grouped items are displayed in a single row, and expanding the grouped items upon receiving an expand command so that the grouped items are each displayed in a separate row. The embodiment further includes removing a row corresponding to an item or to grouped items from the display upon receiving a row remove command and removing a column corresponding to an attribute of the items from the display upon receiving a column remove command.

34 Claims, 12 Drawing Sheets

U.S. PATENT DOCUMENTS

| | | | |
|---|---|---|---|
| 6,014,639 A | 1/2000 | Fohn et al. | 705/27 |
| 6,032,145 A | 2/2000 | Beall et al. | 707/5 |
| 6,131,088 A | 10/2000 | Hill | 705/27 |
| 6,138,130 A * | 10/2000 | Adler et al. | 715/503 |
| 6,169,992 B1 | 1/2001 | Beall et al. | 707/103 |
| 6,195,652 B1 * | 2/2001 | Fish | 707/2 |
| 6,236,985 B1 | 5/2001 | Aggarwal et al. | 707/2 |
| 6,298,342 B1 * | 10/2001 | Graefe et al. | 707/4 |
| 6,523,040 B1 * | 2/2003 | Lo et al. | 707/101 |
| 6,778,985 B1 * | 8/2004 | Jenkins, Jr. | 707/7 |
| 6,779,152 B1 * | 8/2004 | Conner et al. | 715/509 |
| 6,889,359 B1 * | 5/2005 | Conner et al. | 715/509 |
| 6,965,888 B1 * | 11/2005 | Cesare et al. | 707/1 |
| 2001/0034664 A1 | 10/2001 | Brunson | 705/26 |
| 2001/0047372 A1 * | 11/2001 | Gorelik et al. | 707/514 |
| 2002/0093522 A1 * | 7/2002 | Koskas | 345/700 |
| 2002/0116417 A1 * | 8/2002 | Weinberg et al. | 707/517 |
| 2002/0169799 A1 * | 11/2002 | Voshell | 707/503 |
| 2002/0194095 A1 * | 12/2002 | Koren | 705/35 |
| 2003/0028560 A1 * | 2/2003 | Kudrolli et al. | 707/509 |

FOREIGN PATENT DOCUMENTS

| | | |
|---|---|---|
| WO | WO 00/58948 | 10/2000 |
| WO | WO 01-15026 A2 | 3/2001 |
| WO | WO 01-20514 A1 | 3/2001 |

OTHER PUBLICATIONS

R. Pop, et al. "Combining Rows in Query Results", Internet Publication, Sep. 25, 2001, pp. 1-3, XP-002272524 microsoft.public.access.queries.

D. Shank, et al, "Part 2 Developing Office Solutions: Adding Controls", Microsoft Office 2000 Visual Basic Programmer's Guide, 1999, pp. 252-255, XP-002272526, Microsoft Press, Redmond, Washington.

K. Fink, "Overview of PivotTables and PivotCharts in Microsoft Access 2000", Internet Publication, Aug. 16, 2001, pp. 1-14 and 30 slides, XP-002272525.

* cited by examiner

FIG. 3

John Smith Product Search

John Smith Product Search ~300

[CE ballpoint pens]

Search string may include category, part number, manufacturer, description

☐ Include priced products only  ⦿ Table display  ○ Web-style display

304 { ○ Show all categories with *CE ballpoint pens* or click a category below
⦿ Pens  ○ Pen Refills (SEARCH)  (HINTS)

306  306

1-7 of 7 Items Matching Search

| Sup Name ✕▽△○ | Description ✕▽△○ | Mfr Name ✕▽△○ | Price ✕▽△○ | Ink Color ✕▽△○ | Point Style ✕▽△○ |
|---|---|---|---|---|---|
| CE | ballpoint pen | Bic | $1.00 | Blue | 0.5 |
| CE | ballpoint pen | Bic | $1.20 | Red | 0.5 |
| CE | ballpoint pen | Bic | $1.20 | Black | 0.5 |
| CE | ballpoint pen | Pentel | $1.10 | Blue | 0.7 |
| CE | ballpoint pen | Pentel | $1.00 | Red | 0.5 |
| CE | ballpoint pen | Pentel | $1.20 | Blue | 0.7 |

[View Cart]

[NEXT ▲] ~308

*FIG. 5*

John Smith Product Search

John Smith Product Search 300

| CE ballpoint pens |
|---|

Search string may include category, part number, manufacturer, description
☐ Include priced products only  ● Table display  ○ Web-style display (SEARCH) (HINTS)

304 {
○ Show all categories with *CE ballpoint pens* or click a category below
● Pens  ○ Pen Refills
306   306

[View Cart]

1-7 of 7 Items Matching Search

| | Sup Name ✕▽△○ | Description ✕▽△○ | Mfr Name ✕▽△○ | Price ✕▽△○ | Ink Color ✕▽△○ | Point Style ✕▽△○ | Matching Products ✕▽△○ |
|---|---|---|---|---|---|---|---|
| ✕ | CE | ballpoint pen | Bic, Pentel | 1-1.20 | Blue, Red, Black | 0.5 | 5 Products |
| ✕ | CE | ballpoint pen | Bic, Pentel | 1-1.10 | Blue | 0.7 | 2 Products |

[NEXT ▲] 308

FIG. 6

John Smith Product Search

John Smith Product Search

| CE ballpoint pens | | SEARCH | HINTS |

Search string may include category, part number, manufacturer, description
☐ Include priced products only  ● Table display  ○ Web-style display 304 {
○ Show all categories with *CE ballpoint pens* or click a category below
● Pens  ○ Pen Refills
306   306

1-7 of 7 Items Matching Search

[View Cart]

| | Sup Name ✕▽△○ | Description ✕▽△○ | Mfr Name ✕▽△○ | Price ✕▽△○ | Ink Color ✕▽△○ | Point Style ✕▽△○ | Matching Products ✕▽△○ |
|---|---|---|---|---|---|---|---|
| ✕ | CE | ballpoint pen | Bic, Pentel | 1-1.1 | Blue | .5-.7 | 4 Products |
| ✕ | CE | ballpoint pen | Bic, Pentel | $1.20 | Red, Black | 0.5 | 3 Products |

[NEXT ▲] — 308

FIG. 7

John Smith Product Search ~700

```
high pressure valve
```
Search string may include category, part number, manufacturer, description
☐ Include priced products only  ● Table display  ○ Web-style display ○ Categories
● High Pressure Valves ~706

1-13 of 13 Items Matching Search

[View Cart] [SEARCH] [HINTS]

| Sup Name ✕▽△○ | Description ✕▽△○ | Mfr Name ✕▽△○ | Price ✕▽△○ | Connection Size ✕▽△○ | Working Temperature ✕▽△○ | Connection Type ✕▽△○ | Pressure Rating ✕▽△○ | Material ✕▽△○ |
|---|---|---|---|---|---|---|---|---|
| ✕ MHW | Diaphragm Valve | Marvin Valve | $3.25 | 1/2" | 100 F | Flanged | 225 PSI | PVC |
| ✕ MHW | Diaphragm Valve | Marvin Valve | $3.25 | 1/2" | 100 F | Spigot | 225 PSI | PPL |
| ✕ MHW | Diaphragm Valve | Marvin Valve | $3.25 | 3/4" | 100 F | Flanged | 225 PSI | PVC |
| ✕ MHW | Diaphragm Valve | Marvin Valve | $3.25 | 3/4" | 100 F | Spigot | 225 PSI | PPL |
| ✕ MHW | Diaphragm Valve | Marvin Valve | $3.50 | 1" | 100 F | Flanged | 225 PSI | CPVC |
| ✕ MHW | Diaphragm Valve | Marvin Valve | $3.50 | 1" | 100 F | Spigot | 225 PSI | PPL |
| ✕ MHW | Diaphragm Valve | Marvin Valve | $4.00 | 2" | 100 F | Flanged | 225 PSI | CPVC |
| ✕ MHW | Diaphragm Valve | JD Valve | $3.25 | 1" | 100 F | Flanged | 225 PSI | PVC |
| ✕ MHW | Diaphragm Valve | JD Valve | $3.75 | 2" | 100 F | Flanged | 225 PSI | PVC |
| ✕ MHW | Brass Ball Valve | Marvin Valve | $3.50 | 1" | 320 F | Threaded | 225 PSI | Brass |
| ✕ MHW | Brass Ball Valve | Marvin Valve | $4.00 | 2" | 320 F | Threaded | 225 PSI | Brass |
| ✕ MHW | Brass Ball Valve | Marvin Valve | $3.50 | 1" | 320 F | Threaded | 600 PSI | Brass |
| ✕ MHW | Brass Ball Valve | Marvin Valve | $4.00 | 2" | 320 F | Threaded | 600 PSI | Brass |

[NEXT ▲] ~708

FIG. 8

John Smith Product Search —700

```
high pressure valve
```
(SEARCH) (HINTS)

Search string may include category, part number, manufacturer, description
☐ Include priced products only  ● Table display  ○ Web-style display ○ Categories
● High Pressure Valves
—706

1-13 of 13 Items Matching Search

[View Cart]

724—

| Sup Name ✕▽△○ | Description ✕▽△○ | Mfr Name ✕▽△○ | Price ✕▽△○ | Connection Size ✕▽△○ | Working Temperature ✕▽△○ | Connection Type ✕▽△○ | Pressure Rating ✕▽△○ | Material ✕▽△○ | Matching Products ✕▽△○ |
|---|---|---|---|---|---|---|---|---|---|
| ✕ MHW | Diaphragm Valve | Marvin Valve, J | 3.25-3.75 | 1/2" - 2" | 100 F | Flanged | 225 PSI | PVC, CPVC | 6 Products |
| ✕ MHW | Diaphragm Valve | Marvin Valve | 3.25-3.50 | 1/2" - 1" | 100 F | Spigot | 225 PSI | PPL | 3 Products |
| ✕ MHW | Brass Ball Valve | Marvin Valve | 3.50-4.00 | 1" - 2" | 320 F | Threaded | 225 PSI, 600 | Brass | 4 Products |

714— 716—

[NEXT ▲] —708

FIG. 9

John Smith Product Search ⟵ 700

```
high pressure valve                    ( SEARCH )  ( HINTS )
```
Search string may include category, part number, manufacturer, description
☐ Include priced products only  ⦿ Table display  ○ Web-style display ○ Categories
⦿ High Pressure Valves
⟵ 706

1-13 of 13 Items Matching Search

[ View Cart ]

| | Sup Name ✕▽△○ | Description ✕▽△○ | Mfr Name ✕▽△○ | Price ✕▽△○ | Connection Size ✕▽△○ | Working Temperature ✕▽△○ | Connection Type ✕▽△○ | Pressure Rating ✕▽△○ | Material ✕▽△○ | Matching Products ✕▽△○ |
|---|---|---|---|---|---|---|---|---|---|---|
| ✕ | MHW | Diaphragm Valve, B | Marvin Valve, J | 3.25-4.00 | 1/2" - 2" | 100 F, 320 F | Flanged, Spig | 225 PSI | PVC, CPVC | 11 Products |
| ✕ | MHW | Brass Ball Valve | Marvin Valve | 3.50-4.00 | 1" - 2" | 320 F | Threaded | 600 PSI | PPL | 2 Products |

[ NEXT ▲ ] ⟵ 708

FIG. 10

John Smith Product Search ⎯700

```
[high pressure valve]  (SEARCH) (HINTS)
Search string may include category, part number, manufacturer, description
☐ Include priced products only  ⦿ Table display  ○ Web-style display
```

○ Categories
⦿ High Pressure Valves

⎯706

1-13 of 13 Items Matching Search

[View Cart]

| Sup Name ✕▽△○ | Description ✕▽△○ | Mfr Name ✕▽△○ | Price ✕▽△○ | Connection Size ✕▽△○ | Working Temperature ✕▽△○ | Connection Type ✕▽△○ | Pressure Rating ✕▽△○ | Material ✕▽△○ | Matching Products ✕▽△○ |
|---|---|---|---|---|---|---|---|---|---|
| ✕ MHW | Diaphragm Valve | Marvin Valve, J | 3.25-3.75 | 1/2" - 2" | 100 F | Flanged | 225 PSI | PVC, CPVC | 6 Products |
| ✕ MHW | Diaphragm Valve | Marvin Valve | 3.25-3.75 | 1/2" - 1" | 100 F | Spigot | 225 PSI | PPL | 3 Products |
| ✕ MHW | Brass Ball Valve | Marvin Valve | 3.50-4.00 | 1" - 2" | 320 F | Threaded | 225 PSI | Brass | 2 Products |
| ✕ MHW | Brass Ball Valve | Marvin Valve | 3.50-4.00 | 1" - 2" | 320 F | Threaded | 600 PSI | Brass | 2 Products |

[NEXT ▲] ⎯708

INTERACTIVELY COMPARING RECORDS IN A DATABASE

BACKGROUND OF THE INVENTION

1. Field of the Invention

The present invention relates to retrieving, sorting, selecting and organizing items in a database, such as an electronic catalog, using comparisons. More particularly, the invention relates to grouping items in the database based on similarity.

2. Description of the Related Art

Searchable electronic catalogs (e-catalogs) are commonly used in support of various electronic commerce and purchasing functions. These catalogs typically have a user interface for selectively retrieving and displaying records as well as a system for electronically purchasing any items that are selected. A critical factor in the acceptance and success of electronic catalogs is how well they allow a user to find a desired item. As electronic catalogs grow and the number of similar items increases, it becomes increasingly harder to compare the items that are available and to find items with a set of desired features.

The conventional finding aids for an e-catalog are a taxonomical hierarchy of categories and classifications of the items and a search engine. The categories can help a user find an item if the classifications are well understood, but once the appropriate sub-grouping is found it does not help the user sort through large numbers of similar items. A search engine will typically allow a user to search for particular key words and then display the search results. The key word search, however, requires that the user know all possible key words that might be used to describe a particular item or feature of the item. If the catalog has a large number of items, it is also likely that undesired, unrelated items will also be found in the search together with the desired types of items.

Once a list of items is retrieved, it is typically displayed as rows of items. The features of the items are often aligned into tables. If the display includes a large number of items, it can still be difficult to navigate through such a table and isolate the key similarities and differences between the items. Various sorting tools have been offered to assist a user in finding a desired item from a large list. When attributes of the items are each listed in a different column, some search systems allow the user to sort the items based on their respective values in a column. Further searches within only the displayed items can be used to restrict the display list to those having only a certain value or range of values for a particular attribute. Some search engines allow for "parametric refinement" in which a particular value for an attribute can be selected. The search engine will then search within the listed items and display only items with the same value as the selected value for the attribute. For comparisons, some search engines can compare items and flag the differences in the display. This is typically applied only to compare two or three items. With a large number of items, there can be many more differences so that too many attributes are flagged to provide a useful result.

SUMMARY OF THE INVENTION

The present invention can allow an electronic catalog or other set of items to be searched and compared interactively. In one embodiment, the invention includes displaying a list of items in an electronic catalog, each item corresponding to a row of the display, each row having values corresponding to attributes of the corresponding items arranged into attribute columns, grouping some of the displayed items based on a selected attribute upon receiving a grouping command so that the grouped items are displayed in a single row, and expanding the grouped items upon receiving an expand command so that the grouped items are each displayed in a separate row. The embodiment further includes removing a row corresponding to an item or to grouped items from the display upon receiving a row remove command and removing a column corresponding to an attribute of the items from the display upon receiving a column remove command.

BRIEF DESCRIPTION OF THE SEVERAL VIEWS OF THE DRAWINGS

The appended claims set forth the features of the invention with particularity. The present invention is illustrated by way of example, and not by way of limitation, in the figures of the accompanying drawings in which like reference numerals refer to similar elements and in which:

FIG. 3 is a representative display of a list of pens from an electronic catalog system;

FIG. 5 is a representative display of the list of FIG. 3 consolidated based on point style;

FIG. 6 is a representative display of the list of FIG. 3 consolidated based on ink color and then point style;

FIG. 7 is a representative display of a list of valves from an electronic catalog;

FIG. 8 is a representative display of the list of FIG. 7 consolidated based on connection type;

FIG. 9 is a representative display of the list of FIG. 7 consolidated based on connection type and then pressure rating;

FIG. 10 is a representative display of the list of FIG. 7 consolidated based on connection type and pressure rating;

DETAILED DESCRIPTION OF THE INVENTION

I.

The present invention allows a large number of items to be sorted and compared using groupings. The groupings can be used to show the similarities and differences between and among items. They can also be used to eliminate undesired items and isolate the desired ones. As a result, even very long lists of items can be quickly understood and analyzed. Desired items can quickly be isolated using the grouping tools. The groupings can be done and undone based on attributes and categories of the items in an interactive process that dynamically highlights the desired items. The groupings can also be combined with other searching and refining tools.

Figure 1:
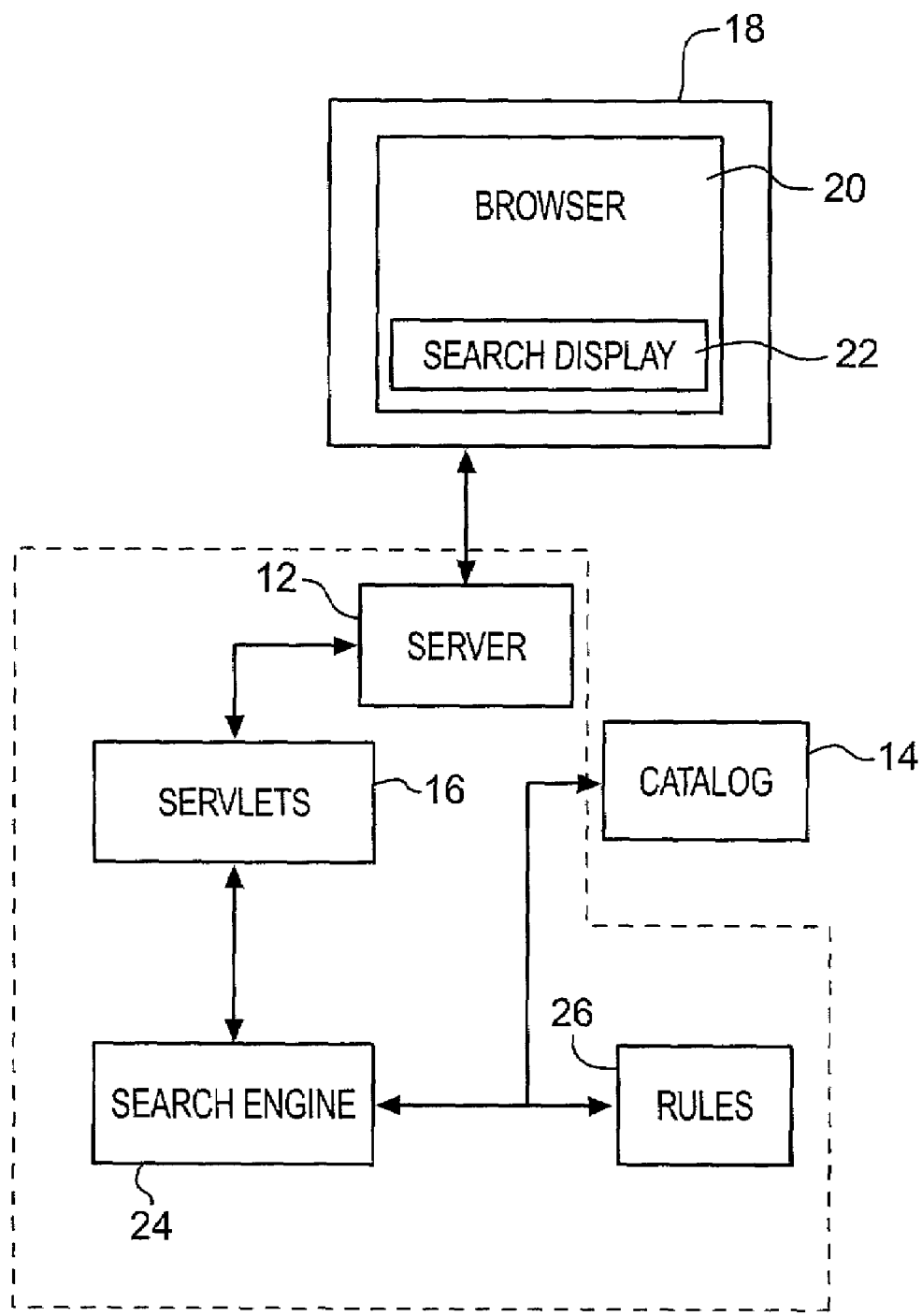
FIG. 1 is a block diagram representation of an electronic catalog system suitable for use in implementing the present invention.

FIG. 1 is a functional block diagram representation of an electronic catalog and automated purchase requisition system. An application server 12 is connected to interact with a database 14 in the form of an electronic catalog which resides in a computer memory storage device at the server or at another device. The catalog can be integrated with the server, co-located with the server or connected using a local or wide area network connection. Users of the system have workstations or clients 18 that are connected to the application server 12 through a local or wide area network such as the Internet or an intranet. The client includes a browser 20 such as a common Internet web browser or dedicated software through which the workstation communicates with the server 12 to render a search display 22.

Commands entered into the web browser software can cause information to be extracted from the database 14 and displayed at the workstation 18 in the search display or in some other display. While the invention will be described in terms of browsers communicating using typical web interfaces such as HTTP (Hyper Text Transfer Protocol) and Java instructions, the present invention does not rely on any particular platform or interface. The invention can use web-type browser software or software that has been developed specifically for the purposes of the present invention with unique code, interfaces and display technologies. The invention can be implemented on a single machine or with any kind of distributed processing environment from mainframes with dumb terminals to wireless servers with mobile radio PDAs (Personal Digital Assistant).

The database 14 is an electronic catalog of items, such as products or services. The database 14 can be constructed using a uniform catalog schema so that each product has a single database record that includes all of its different suppliers. However, multiple catalogs, one or more for each supplier, or an aggregated catalog, an aggregate of product information from multiple suppliers, can also be used. In the aggregated catalog, the same item may be listed several times in inconsistent ways.

In one embodiment of the invention, the server 12 uses servlets 16 to operate a search engine 24 that accesses one or more electronic catalogs 14. The search engine is a common and useful application of the present invention, however the present invention can be used whenever records are retrieved from the catalog. It can be used to generate a catalog to be published whether to a marketplace, a purchaser or a seller. It can also be used for any direct product purchase and for any other use of catalog records, such as system administration, management and quality control.

In the search engine example, the application server 12 queries the database 14 through the search engine and directs the results to the workstation 18. The type or format of the catalog is irrelevant as long as the catalog will respond appropriately to a query from the search engine 24. For example, the catalog may reside within a relational database or may reside within an object-oriented database. The catalog can be stored on a disk drive, a tape drive, RAM, or any other computer data storage devices. The application server 12 may reside in a computer attached directly to the storage device, or alternatively may be connected to the storage device 16 through a network. In one embodiment, the servlets are based on Java APIs (Application Program Interface) and JavaScript/HTML (Hyper Text Markup Language) Interface Generation. These use JDBC (Java Database Connectivity) to communicate through the search engine to a separate data store where the catalog resides. The JDBC protocol allows the search engine to communicate with a catalog based on a variety of different commonly used databases including those available from Oracle Corp., Microsoft Corp., and SAP AG.

The search engine 24 is also connected to a rules store 26 through similar Java or HTTP-type protocols. The rules store contains rules that are used to configure, modify or present data that has been requested by the user. As an alternative to the rules store, the rules can be incorporated into the catalog. In one embodiment, the catalog is in the form of XML (Extensible Markup Language) statements and these statements can include values for attributes of catalog items or rules about how to determine values of catalog items. Other types of markup languages, such as SGML (Standard Generalized Markup Language) and HTML (Hyper Text Markup Language) can be used as can other types of database formats.

Figure 2:
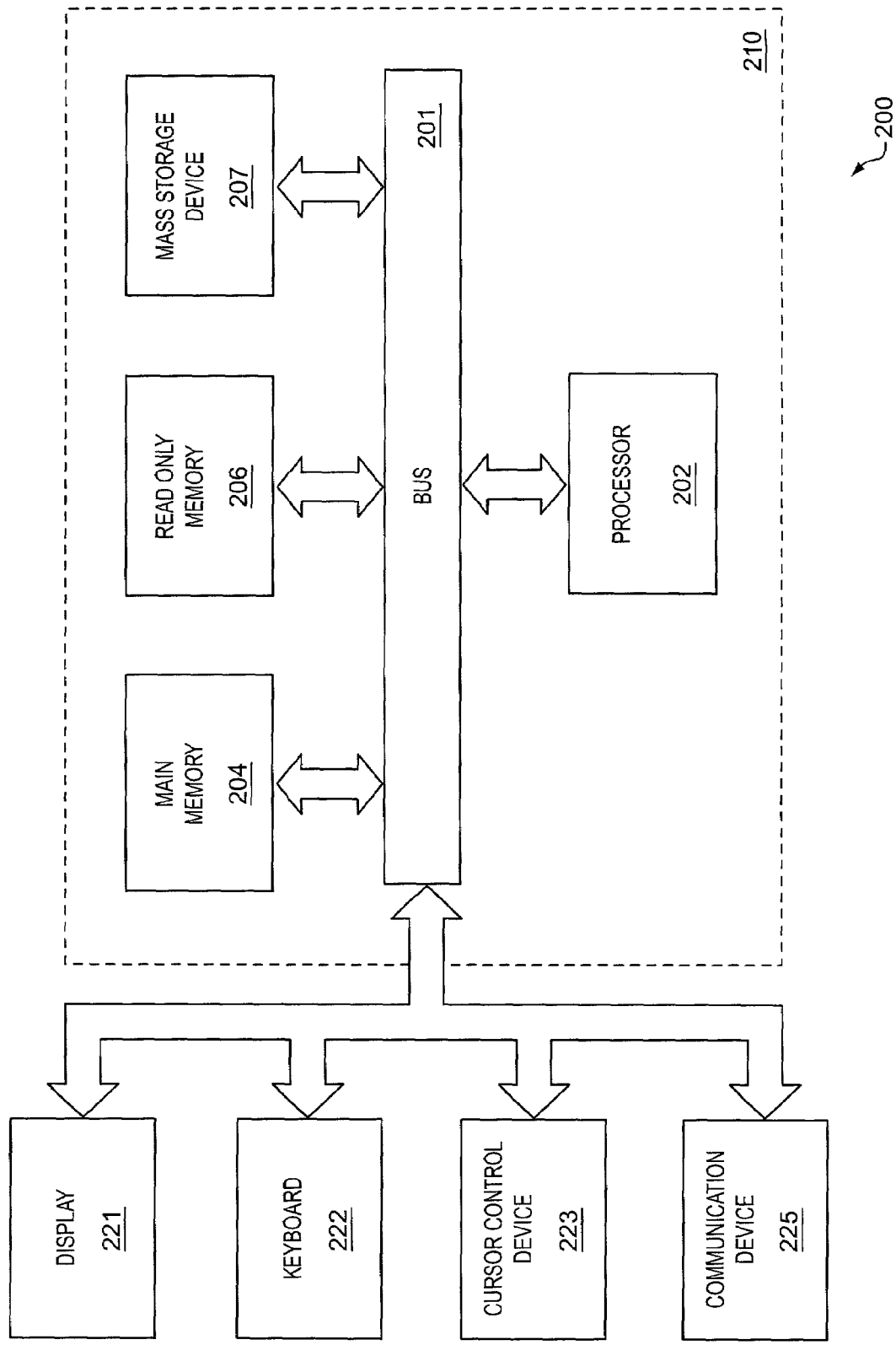
FIG. 2 is a representative example of a computer system suitable for implementing the present invention.

A computer system 200 representing an example of a system upon which features of the present invention may be implemented is shown in FIG. 2. The workstation, search engine, servers, and databases of FIG. 1 will typically be configured similar to what is shown in FIG. 2. Each of these components can be provided using its own computer system or several different components can be combined. For example, the search engine, server, rules, and catalog can all be provided using a single computer system. The computer system can be deployed on a single platform as shown, or different components can be provided on separate platforms so that the bus 201 connects several different platforms together containing different portions or aspects of the mass storage 207 and other system 210 components. The computer system can also be implemented in one or more small portable platforms such as laptops and PDAs.

The computer system 200 includes a bus or other communication means 201 for communicating information, and a processing means such as a microprocessor 202 coupled with the bus 201 for processing information. The computer system 200 further includes a main memory 204, such as a random access memory (RAM) or other dynamic data storage device, coupled to the bus 201 for storing information and instructions to be executed by the processor 202. The main memory also may be used for storing temporary variables or other intermediate information during execution of instructions by the processor.

The computer system may also include a nonvolatile memory 206, such as a read only memory (ROM) or other static data storage device coupled to the bus for storing static information and instructions for the processor. A mass memory 207 such as a magnetic disk or optical disc and its corresponding drive may also be coupled to the bus of the computer system for storing information and instructions such as the various databases.

The computer system can also be coupled via the bus to a display device or monitor 221, such as a cathode ray tube (CRT) or Liquid Crystal Display (LCD), for displaying information to a user. For example, graphical and textual indications of installation status, operations status and other information may be presented to the user on the display device. Typically, an alphanumeric input device 222, such as a keyboard with alphanumeric, function and other keys, may be coupled to the bus for communicating information and command selections to the processor. A cursor control input device 223, such as a mouse, a trackball, or cursor direction keys can be coupled to the bus for communicating direction information and command selections to the processor and to control cursor movement on the display 221.

A communication device 225 is also coupled to the bus 201. The communication device 225 may include a modem, a network interface card, or other well known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example. Source Content and the databases can be made available to the computer system in this way.

It is to be appreciated that a lesser or more equipped computer system than the example described above may be preferred for certain implementations. Therefore, the configuration of the exemplary computer system 200 will vary from implementation to implementation depending upon numerous factors, such as price constraints, performance requirements, technological improvements, or other circumstances.

II.

The search engine 24 is activated by the application server 12 in response to inputs from the workstation's web browser. The search engine follows an algorithm, for example the algorithm described in U.S. Pat. No. 6,032,145, the disclosure of which is incorporated fully by reference herein, to search through the catalog for any items related to the query. The algorithm in the above-mentioned patent applies a cascading sequence of progressively broader searches in order to locate records in the catalog. This provides a significantly greater probability that a desired item will be found. However, any other type of search algorithm can be used. A proximity query, for example, is offered in some well-known commercial databases, such as those from Oracle Corp.

In the present application, the search can be a broad search based on any characteristic of an item generally, for example, a search for a Bic brand pen. Alternatively, the search can be very specific for a single item, such as Bic part number SCSM11. In either case, the user inputs a search string to the web browser guided by the search display 22 as shown in FIG. 2. The search string can be free-form or subject to specific structural rules. The particular format of the search algorithm and the input string is not important to the present invention. The search string may comprise search terms in any order. For example, the search string can include the name of an item, a part number for an item, or any descriptive attribute of the item. The search engine can be designed to handle misspellings, word fragments, or any other string that may lead a user to find the desired product within the database 14.

An example of a search display 22 is shown in FIG. 3. This display already includes the results of the search, in this case a list of ballpoint pens. The display, in this example, has a single text box 300 for search strings located in the upper-left corner of the display. The example search string in box 300 is "CE ballpoint pens" which represents three words to be found in any part of the data record corresponding to each item. CE was found in the supplier name field and ballpoint and pen were found in the description. Search strings may be applied against specific fields or attributes of each item and there may be separate text boxes for different parts of the search strings. Searches can also be conducted using ranges for numerical or alphabetical values. The single box shown in FIG. 3, however is simpler to use. The display has several other areas of information, as shown in FIG. 3. The search results or list of identified items is shown in a display list 302. The display list 302 includes, the supplier name, the short description, the manufacturer name, the price, the ink color and the point style. Any number of other attributes can also be displayed including, for example, the manufacturer part number, a long description, a supplier part number, availability, etc. For each of these fields, values are shown for each item or record.

A compilation of each unique category of product, compiled from the list of the identified items, is shown in a category display area 304. If several different categories of products were found during the search, then each category will be displayed along with a corresponding CATEGORY radio button 306. The user can narrow the list by selecting one of the categories. In FIG. 3, pens has been selected, so only pens are displayed. If the desired item from the catalog is not immediately visible in the display, the user has the option of paging through the remaining items in the list by clicking on a NEXT button 308. If the desired item is found, no further searching is required.

A further alternative is to select only items having a particular manufacturer. The search display also includes a MANUFACTURER (Mfr Name) button 310. This can be used to invoke a screen containing a list of all manufacturers of the products shown in the display list 302. Selecting one of the manufacturers will cause the server 12 to narrow the display list 302 to include only items from the selected manufacturer. The user can also use information in the display to submit a new query to further limit the results. For example a query for "bic pen red" will return a shorter list of items. In this case, there is only one such item.

One way to generate the display of FIG. 3 is for the user to enter a query into a browser or dedicated catalog application. The search query is sent over a network, such as the Internet or an intranet, by the client 18 from the browser 20 to the application server 12 using, e.g. HTTP. The application server 12, upon receiving the query parses the HTML packet as appropriate for the search engine 24. It also determines the identity of the user based on embedded ID codes, the packet source or some other approach. The search engine can perform any one or more types of queries using the search string to find a match for the search string within the database 14. Typically, the search string within the HTML packet is compared to catalog text that is identified as attribute values of each item. If no record is identified in response to the query, then the application server builds a results display by compiling the information into an HTML package that can be displayed within the browser to show the user that no records have been found. This display is sent back over the network using, e.g. HTTP to the workstation browser where it is displayed as a web page or a window to the user in the search display 22. The user can then try another query, try another catalog etc.

If a record is identified, then the search engine can retrieve the values of the attributes for the identified records from the catalog. As discussed above, FIG. 3 shows an example of some catalog records with attributes and values displayed. The attributes as displayed are category, supplier name, short description, manufacturer name, price, ink color, and point style.

Any number of other attributes can also be displayed including, for example, the manufacturer part number, a long description, a supplier part number, availability, etc. These attributes have been selected as examples, but many other attributes can be included in the catalog. The attributes can be viewed as being of two types. Global attributes, such as the category, supplier name, short description, manufacturer name and price, apply to all types of items. Local attributes apply only to certain kinds of items. Local attributes can be such things as ink color and point style as shown, or for other items attributes such as voltage, fuel capacity, connector size, etc. The items each have values for each attribute as shown in the display list 302, although, it is possible that the catalog be incomplete for some items. For example, category has the value pens. Manufacturer name is shown with values of Bic and Pentel, etc. These values are stored and maintained in the catalog from which they have been retrieved.

III.

Figure 4:
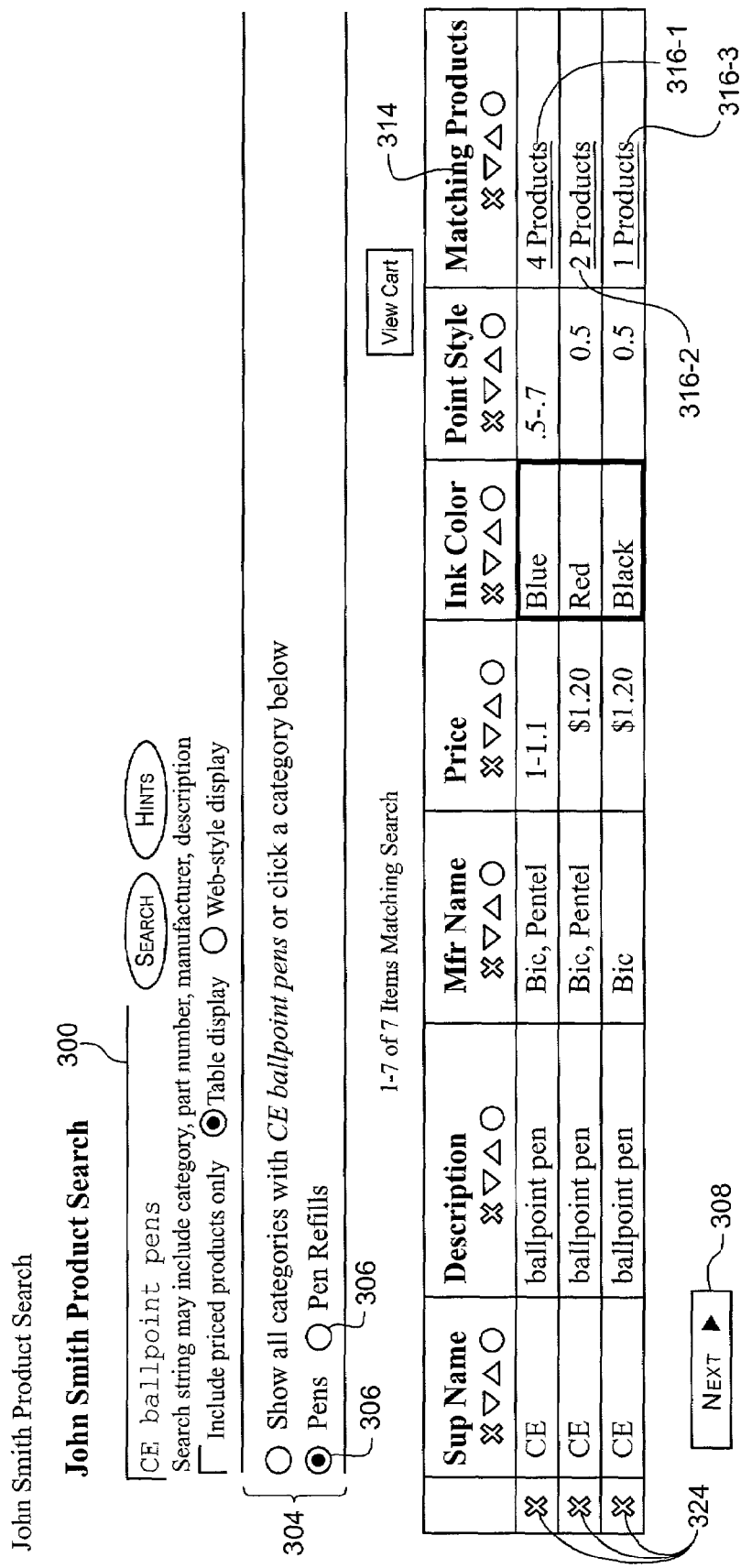
FIG. 4 is a representative display of the list of FIG. 3 consolidated based on ink color.

The list of pens is taken as a simple example to illustrate the operation of one embodiment of the invention. While the grouping comparisons are useful even with a small number of items, they are still more useful when there are hundreds of items in each group. Each of the six attributes in the display has a COMPARE button 312-1, 312-2, 312-3, 312-4, 312-5, 312-6 associated with it. By selecting one of the COMPARE buttons, the user can cause items to be grouped together based on the corresponding one of the displayed attributes. FIG. 4 shows possible results when the user selects consolidation based on the Ink Color attribute using a COMPARE button 312-5.

In FIG. 4, the pens having a blue value for ink color have been consolidated onto a single line. The group of blue pens is displayed in the same way that a single item would be. The manufacturer names for the group of blue pens have been combined so that the attribute value for the consolidated single item shows both manufacturer names. The price and point style values, however, show the range of values, rather than listing each value separately. The nature of the display for the consolidated attribute values can be set by default or by the user. In the present example, different numerical values for a group of items are shown as a range when displayed as a single item. Descriptive words for the items in the group are listed in the cell for the corresponding attribute. As can be seen from FIG. 3, however, it would also be possible to list all of the prices or all of the point styles. Similarly, the descriptive words could be consolidated into a range. In one embodiment, numerical and currency values are shown as a range, while text values are shown as a list. Alternatively, the user can be asked to indicate a preference. The red pens have also been consolidated and are shown on one line as a single item in FIG. 4. There is only one black pen, so it has not been grouped with any other items. The display for the black pen has not changed.

Each of the consolidated single items in FIG. 4 have been supplemented with a new attribute, labeled "Matching Products 314." This attribute, shown as a new column, simply indicates how many items have been consolidated into the single item. The values for "Matching Products 316-1, 316-2, 316-3" are underlined to indicate that they are selectable on the user interface of the display. In the present example, selecting the value for the matching products attribute will result in the single consolidated item being expanded into a display of all of the constituent items. For example, selecting "2 Products" 316-2 in the "Matching Products" column will replace the second row, as seen in FIG. 4, with two rows, one for each of the two red pens shown in FIG. 3. Selecting "1 Products" 316-3 from the same catalog will not result in any change in the display because a line item for one item cannot be expanded. The specific details of the one black pen are already displayed. The consolidated items are also shown with the selected attribute Ink Color highlighted. This reminds the user which attribute served as the basis for the consolidation.

FIG. 5 shows a similar result based on the selection of the COMPARE button 312-6 for the Point Style attribute. As with FIG. 4, the pens have been grouped together based on the value for each pen for the selected attribute. While in FIG. 4 pens of the same ink color are combined into groups, in FIG. 5 pens with the same point style are combined. As can be seen from the matching products attribute, five pens with a 0.5 point style are grouped together and displayed are on a single line as a single item would be, while the two pens with a 0.7 point style are displayed as a different single item. The three different ink color descriptions for the three different 0.5 point pens are combined into a list of all the different available ink colors. For the 0.7 point pens, the only available ink color is black. The price is shown for both consolidated groupings as a range, rather than as single values, similar to FIG. 4.

One use of the COMPARE button 312 in FIGS. 4 and 5 can be to focus in on a particular desired attribute value and eliminate all the others. For example, if the user is looking for a red pen, the user can consolidate on ink color as shown in FIG. 4. The blue and black pen rows can be removed from the display by selecting the corresponding REMOVE button 324, the x's at the start of the respective row. The red pen item can then be expanded by selecting "2 Products" under the "Matching Products" heading. The resulting display would show only the red pens. This example shows how the user can iterate with grouping and expanding using different product attributes until the desired item is found. The grouping function can also be used to view the possible values for red pens in a convenient way. For example, it is much easier to see that all red pens are priced at $1.20 from FIG. 4 than from FIG. 3. The grouping can also be used to make comparisons across groupings. For example, FIG. 4 shows clearly, that blue pens are less expensive than red pens and are available in more point styles.

The benefits of grouping can be taken further by grouping the groups, i.e. consolidating some of the consolidations of items. In FIG. 6, the pens have first been grouped on the basis of ink color as shown in FIG. 4, the ink color groupings are then grouped on the basis of point style. The red group and the black group have the same value for point style "0.5" so they are consolidated into a single item. The blue group has a range of values that includes 0.5 and 0.7 so it remains separate. Sequential groupings can be applied to the attributes in any order and to as many different attributes as desired in order to allow even further comparisons of the listed items. The grouping of FIG. 5 based on point style can be consolidated further on ink color. However, the result would be the same as the display in FIG. 5 because the two groupings have different ink color values.

IV.

The displays of FIG. 4 include several other items that can be very helpful in finding an item. These features are intended to be used by selection on a graphical user interface. The selections can be made by moving a pointing device to the corresponding button, icon or text and then indicating a selection of the button, icon or text. Typically this is done by pointing and clicking with a mouse, however, any other selection device can be used. In addition, different user interface tools can be applied as alternatives, such as function keys, text commands, voice response, keypad buttons, pull-down menus, etc. The GUI shown in the figures is intended as one example that can easily by implemented using current technology.

In addition to the COMPARE button mentioned above for each attribute column., each column also includes a REMOVE button 318, a SORT UP button 320, a SORT DOWN button 322, and a selectable attribute name 310. The REMOVE button 318 removes the column from the display. The column can be recalled later, but by removing the column, more room is provided for other columns to be displayed on the screen. In the pens example, above, the pens were all from the same supplier. By removing this information another attribute can be displayed. Removing the information from the display does not remove it from the database, the information can still be used in sorting, searching and comparing even though it is not seen on the display. The sorting buttons allow the items in the table to be sorted based on the value for the particular attribute. The SORT UP button 320 sorts the items in ascending order, while the SORT DOWN button 322 sorts the items in descending order of the value for the attribute.

By selecting the attribute name 310, the display can be refined based on the selected attribute. One such parametric refinement is to restrict the display to items having a single highlighted value for the attribute. In this embodiment, a desired attribute value is first selected, then the attribute name is selected to refine on that value. In another embodiment, selecting the attribute value causes the interface to generate a dialog box. From this dialog box, the user can input a selected value for parametric refinement, or a range of values. The dialog box can also provide sorting and display options as an alternative to all the separate buttons discussed above.

Each row also is shown with a MATCHING PRODUCTS button 314 and a row REMOVE button 324. Selecting the MATCHING PRODUCTS button will expand the consolidated items into all the constituents so that all of the items are displayed individually again. Selecting a row REMOVE button will result in the row, whether it is an item or a consolidated group of items being removed from the display. As a result, a very large number of items can be sorted.

The GUI displays of FIGS. 3–10 also include search boxes, category selectors and other searching, sorting and finding tools. These can be combined with any number of other searching and sorting tools to further enhance the usefulness of the system. The interactive comparison process can also be used as a search tool. In an example of a search through an electronic catalog for a blue 0.5 point ballpoint pen, the user can simply search for "blue 0.5 point ballpoint pen." Alternatively, the user can begin with the entire catalog. To narrow things down the user can also begin with the search results for the word "pen". The entire catalog can then be grouped by manufacturer name. This will cause many of the items to be consolidated. The user can scroll down the short descriptions to "ballpoint pens" and then eliminate all the other rows. Once isolated, the ballpoint pens can be expanded by selecting the PRODUCTS button. The pens can then be consolidated by color and by point style. The blue 0.5 pens will all then appear in a single row. After removing the other rows, the blue 0.5 pens can be expanded and compared to each other based on any other attributes, including price, manufacturer, description etc.

In this example, the user dynamically interacts with the display to systematically find and isolate the desired item. This interactive operation of the GUI provides tremendous benefits when there are a large number of very similar items. Another way to find the blue 0.5 point ball point pen is to begin with a category. The user can select the pen category from the catalog and be presented with a display of the hundreds of different available pens. One advantage of a category approach is that category-specific attributes can be used immediately. The hundreds of pens can be consolidated on ink color and point style to isolate the blue 0.5 pens on a single line. Eliminating all the other rows and expanding the blue, 0.5 row allows further comparisons to be made based on the resulting specific display.

V.

FIG. 7 shows a more complex set of items that can be the result of a search request, a direct query, a category selection or the result of any other catalog selection process. The items are valves and in addition to the global attributes of supplier, description, and price, they are displayed with the additional local attributes of connection size, working temperature, connection type, pressure rating and material.

As with FIG. 3, the display includes a row for each item and the descriptive values for each item are arranged into attribute columns. The search window 700 shows the search terms. The category window 706 shows the single category of items for the search results. A next button 708 takes the user to the next screen. The display table has a header row with a name 710 at the top of each column for each attribute, as with the pens. The name 710 is selectable to call up a list of all the different values. The user can then select a value and restrict the display e.g. to a selected price or range of prices. Next to each attribute are the REMOVE button 718, SORT DOWN button 722, SORT UP button 720, and COMPARE button 712. In FIG. 8, the COMPARE button for the Connection Type attribute has been selected in order to consolidate items based on connection type. The groupings show, using the "Matching Products" column, that there are 6 flanged connection valves, 3 spigot connection valves and 4 threaded connection valves.

In a manner similar to the example above with the pens, some attribute values for the groups are consolidated to show a range of values. For example, the price and connection size are displayed as ranges that include all of the values in the items that have been consolidated. For the flanged valve, for example, the connection sizes are ½, ¾, 1 and 2, these are consolidated into the display as ½–2. The pressure ratings on the other hand are not consolidated. For threaded valves both possible values, 225 PSI and 600 PSI, are shown as a list. This display is partially blocked because the cell in the table does not have enough room. Any one of a variety of user interface features can be provided to allow the user to see all of the contents of each cell. The choice of displaying a range or listing all the values can be made by the system or by the user. For example, when the COMPARE button is selected, a dialog box can be displayed to allow the user to select whether to show ranges or lists. Alternatively, the system can be configured to display a list when there are two or three values and a range when there are more values.

In FIG. 9, the valves have been expanded back to the FIG. 7 display and then consolidated on the Pressure Rating attribute. This allows the user to see that there are two different pressure ratings. The 600 PSI valves are consolidated together and the common features between the two 600 PSI valves can easily be seen in the display. In addition, the greater variety of features for the eleven 225 PSI valves can also be seen from the consolidated displays of attribute values.

FIG. 10 shows a different approach to combining multiple consolidations than that shown with respect to the pens in FIG. 6. In FIG. 6, the order in which the consolidation was performed affected the display. Each subsequent consolidation was performed on the items as they had already been consolidated. So, for example, in FIG. 6, the consolidation was performed on the display of FIG. 4. FIG. 4 shows 4 blue pens as a single item. Two of the blue pens have a 0.5 point style and two of the pens have a 0.7 point style. When the consolidation was performed on the three groups of pens based on point style, the blue pens with the 0.5 point were not consolidated with the red and black pens that also have a 0.5 point style. Instead, the blue pens listed together as a single item stayed together as a single item. In addition, that single item has a point style range of 0.5–0.7 which does not match the 0.5 point style of the other pens so it was not consolidated with the other pens. On the other hand, when the pens are consolidated first on point style, as in FIG. 5, all of the 0.5 pens are combined into the single listing.

FIG. 10 shows an approach to consolidating in which the order in which attributes are selected for consolidation does not matter. In FIG. 10, items are only consolidated if they have matching values for both selected attributes. The consolidation has been performed on the Connection Type and Pressure Rating attributes. Accordingly, each consolidated item has only a single value for the Connection Type and Pressure Rating attributes. This immediately shows the viewer which combinations of those two attribute values are offered. A 600 PSI rating is available only with a threaded connection type, for example. All three connection types are available with a 225 PSI rating and there are only two pressure ratings in the table, 225 PSI and 600 PSI. As can be seen from the examples provided, both consolidation approaches can be very helpful in finding an item. The system can be configured to provide one or the other or the user can be offered a choice when the COMPARE button is selected.

The display of FIG. 10 can also be obtained in using an iterative approach in a system in which the order of consolidation does matter. In such an example the user can first consolidate on one of the attributes Connection Type or Pressure Rating. The resulting display can then be expanded based on the other attribute to obtain the FIG. 10 display. So, for example, if the display were consolidated first on Connection Type (see FIG. 8) and then expanded on Pressure Rating, the grouping of threaded valves would be broken up into the 225 PSI and 600 PSI grouping as shown in FIG. 10. In either event, the present invention can allow a user to iterate through many different displays to get a thorough understanding of the items and to find a particular desired item.

VI.

Figure 11A:
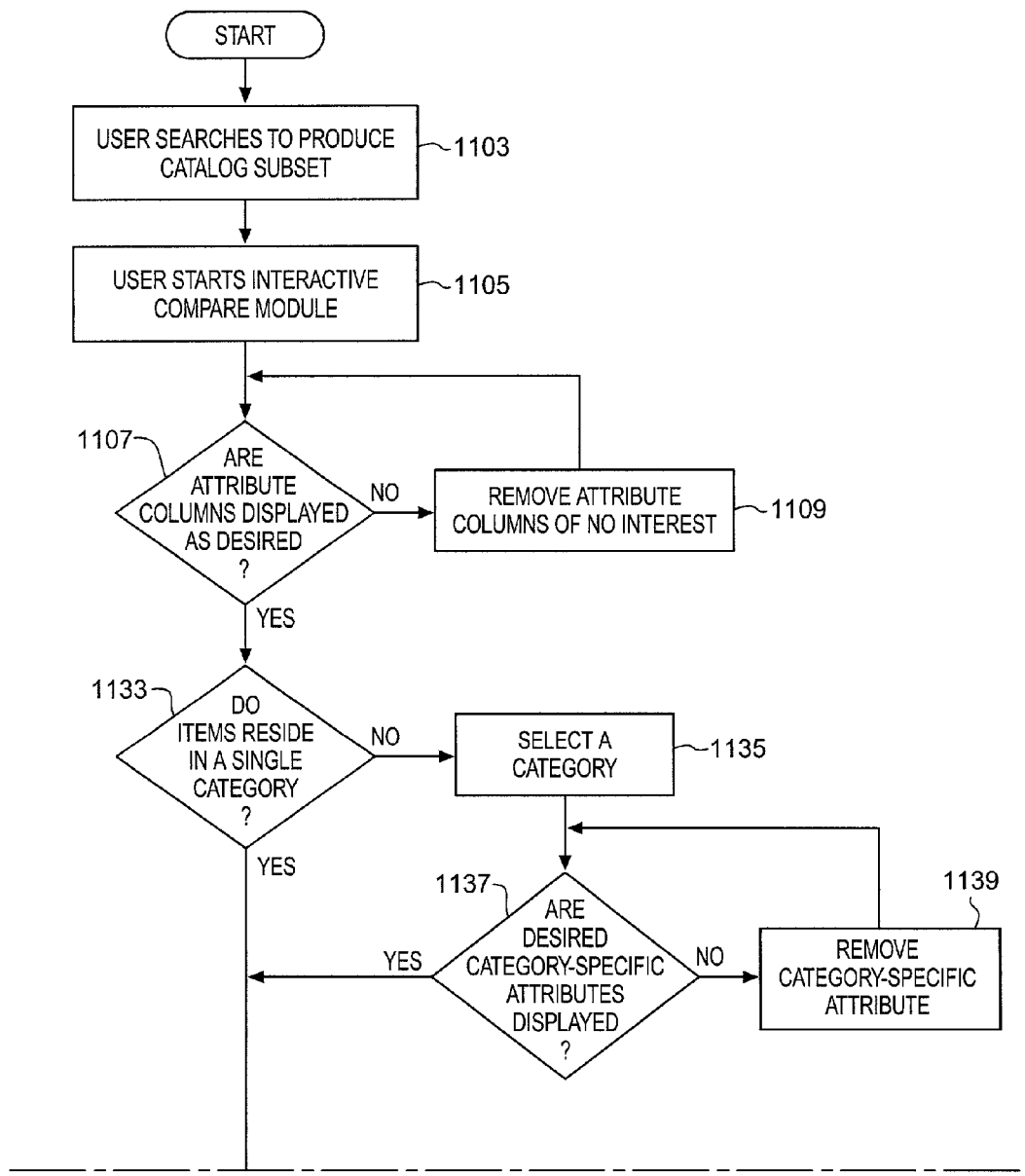
FIG. 11A is a flow diagram of comparing different items using attributes and categories.

FIG. 11 shows a process for finding an item using the interactive comparisons of the present invention as described above with respect to the graphical user interface (GUI) shown in FIGS. 3–10. In FIG. 11, the user begins by performing a search 1103 using a search interface of the electronic catalog. A search is not required, the user can also begin by selecting a category or subcategory of items or by using an existing list. The user can also begin with the entire catalog. The interactive comparisons made possible by the present invention can allow thousands or even millions of catalog items to be compressed and analyzed in a short amount of time in order to find the item desired.

Having obtained a list of items, the user can begin the interactive compare module 1107 to perform the functions described above. Before grouping any items, the user can modify the display. If the attributes of interest are not presented in the desired way 1107, then the user can change the display. For example, the user can scroll over to other attributes or remove attributes from the display 1109 using the appropriate REMOVE button for the intended attribute. The removed attributes can be restored and remain in the catalog for search and other purposes. Once the display presents the attributes as desired the user can then begin the interactive comparison process by choosing an attribute and selecting the COMPARE button for that attribute 1111. This causes similar items to be consolidated into a single item as explained above.

Figure 11B:
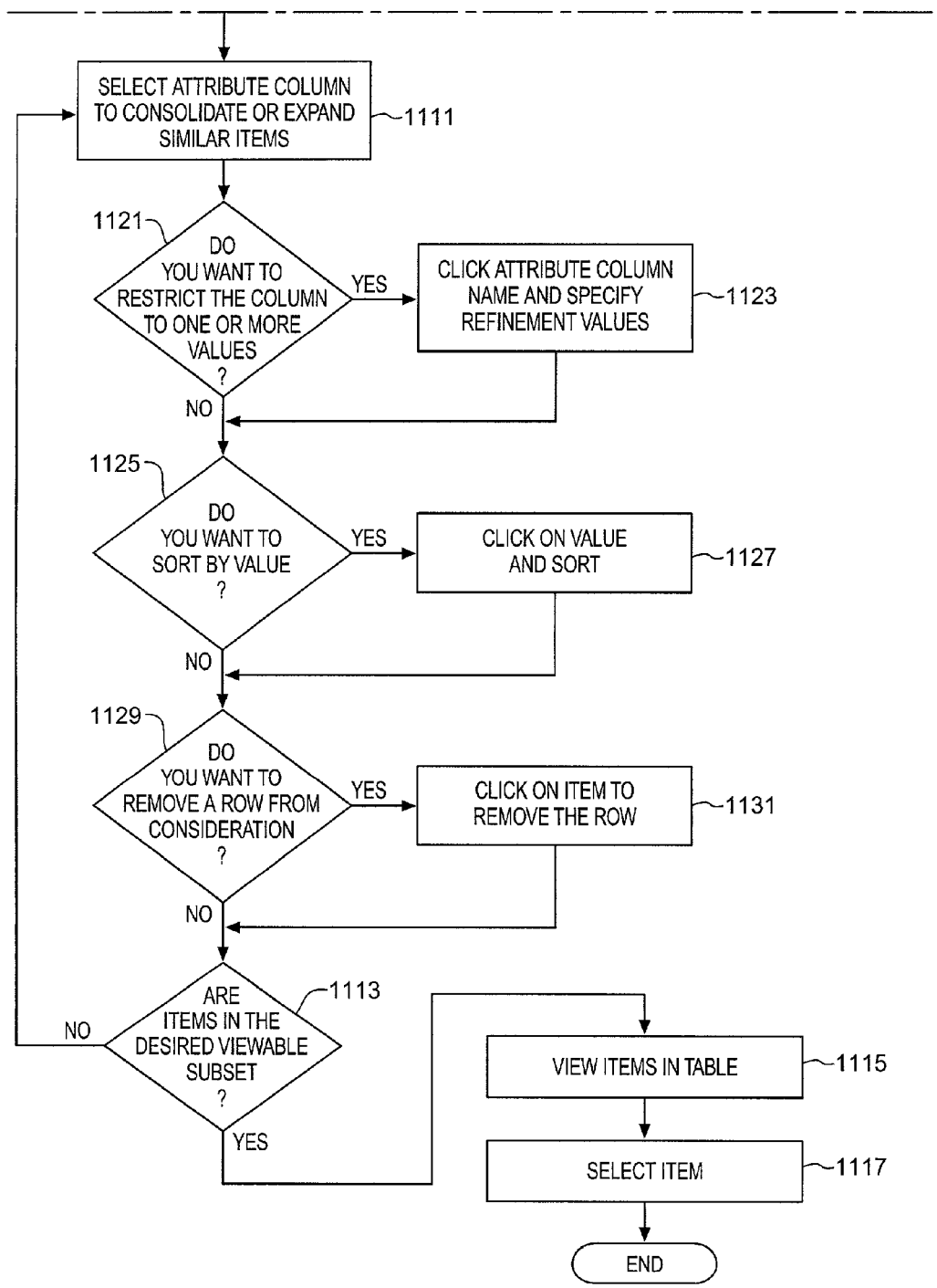
FIG. 11B is a flow diagram of a portion of the diagram of FIG. 11A showing more detail of comparing using rows and columns.

If the items are now presented in the desired viewable subset 1113, then the items can be viewed in an expanded form 1115 and the desired item selected 1117. If the presentation of items is not in the desired viewable subset which can allow the user to easily find the desired item 1113, then the display can be further adjusted as shown in FIG. 11B. The user can select a different attribute or additional attributes 1111 for consolidation. The resulting items can be restricted so that attribute columns have only one or a small range of values 1121. So, for example, the list of valves can be restricted to those with 1 inch connectors. This can be done, in one embodiment of the GUI by clicking on the attribute name. A dialog box will be generated into which the value or values can be entered 1123. This is sometimes referred to as parametric refinement.

In addition, the results display can be adjusted by sorting the items according to a value of one of the attributes 1125. In one embodiment of the GUI, this can be done by clicking on an attribute name and selecting a sort option in a dialog box that is displayed 1127. In another embodiment, this can be done by clicking on an attribute value and selecting sort in a resulting dialog box or menu. This command will sort each of the items, including consolidated item groups according to the selected attribute. So, for example, lower pressure ratings will be listed before higher pressure ratings.

The display can be further adjusted by removing a row from the display 1129. This row can correspond to a single item or a consolidated grouping of items. The row can be removed in one embodiment by selecting a REMOVE button from the appropriate row 1131. The items can, by iterating through the options of FIG. 11B, be put into an appropriate viewable subset that allows items to be compared and the desired item to be selected. The user can iterate through the options of FIG. 11B, alternately expanding and consolidating items until just the desired item can be isolated.

In addition to grouping using attribute values, sorting and parametric refinement, the display can be further refined using categories. The user can refine the display so that all of the listed items are in a single category. For an electronic catalog, the items are typically sorted or associated taxonomically with categories such as "Furniture, Chairs" or "Stationery, Pens". If the items are not already all in a single category 1133, then the user can select a single category 1135 eliminating all the items in other categories. This can be done by selecting one category from the displayed list on the GUI.

As a result of selecting a category 1135, the local attributes specific to that category will be displayed. These local attributes can be reviewed to determine if the desired local attributes specific to the particular category are displayed 1137. In the examples above, these attributes include, ink color, point style, pressure rating etc. The undesired attributes can be removed 1139 in the same way that was described with respect to FIG. 11B. The attributes can also be used for sorting, ranging and refining all as described with respect to FIG. 11B. Accordingly, categories and attributes can be used iteratively to enhance comparisons. Once the desired item is found and selected, it can be added to a shopping cart or displayed in another way so that others of its relevant attributes can be seen. A detail view, for example, may be available that shows an illustration of the item, price and delivery terms and availability. Alternatively, the item can be accessed for administrative or data management purposes. The item can be modified deleted, added to or tested to keep the catalog up-to-date or to monitor its quality.

VII.

It should be noted that, while the steps described herein may be performed under the control of a programmed processor, such as the processor 202, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present invention includes various steps, which may be performed by hardware components or may be embodied in machine-executable instructions, such as software or firmware instructions. The machine-executable instructions may be used to cause a general-purpose or special-purpose processor programmed with the instructions to perform the steps. Alternatively, the steps may be performed by a combination of hardware and software.

The present invention may be provided as a computer program product that may include a machine-readable medium having stored instructions thereon, which may be used to program a computer (or other machine) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

Importantly, while embodiments of the present invention are described with reference to finding office supplies and valves in an e-catalog, the method and apparatus described herein are equally applicable to finding, comparing and sorting items in any other type of electronic catalogs and any other source of items including documents, and data files. In addition, while the invention has been described in terms of an electronic catalog, other types of ordered information stored in an electronic form can benefit from the present invention.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A method comprising:
    displaying a list of items in an electronic catalog, each item corresponding to a row of the display, each row having values corresponding to attributes of the corresponding items arranged into attribute columns;
    grouping some of the displayed items based on a selected attribute upon receiving a grouping command from a viewer of the display so that the grouped items are displayed in a single row having attributes corresponding to attributes of the grouped items and attribute values corresponding to the attribute values of the grouped items, wherein the grouping command is received after displaying the list of items;
    expanding the grouped items upon receiving an expand command from a viewer of the display so that the grouped items are each displayed in a separate row, wherein the expand command is received after displaying the list of items and after a group command is received;
    removing a row corresponding to an item or to grouped items from the display upon receiving a row remove command from a viewer of the display, wherein the row remove command is received after displaying the list of items; and
    removing a column corresponding to an attribute of the items from the display upon receiving a column remove command from a viewer of the display, wherein the column remove command is received after displaying the list of items.

2. The method of claim 1, further comprising sorting the items based on attribute values upon receiving a sort command for one of the displayed attributes.

3. The method of claim 1, further comprising restricting the displayed items to a range of values for one of the displayed attributes upon receiving a refinement command for one of the displayed attributes.

4. The method of claim 3, wherein receiving a refinement command comprises receiving a selection of a value for the one of the displayed attributes.

5. The method of claim 1, further comprising displaying a count of the grouped items in the corresponding single row.

6. The method of claim 5, wherein receiving an expand command comprises receiving a selection of the count of the grouped items.

7. The method of claim 1, further comprising grouping further ones of the displayed items including grouped items based on a second selected attribute upon receiving a second grouping command so that the further grouped items are displayed in a single row.

8. The method of claim 1, wherein grouping comprises comparing the values for the selected attribute for at least two of the items and combining items that have the same value for the attribute into a single row.

9. The method of claim 1, wherein grouping comprises comparing the values for the selected attribute for at least two of the items and combining items that have values for the attribute within a range into a single row.

10. The method of claim 1 further comprising:
    removing all of the items from the display except for items of a selected category upon receiving a category command; and displaying item values for attributes related specifically to the selected category.

11. The method of claim 10, further comprising:
grouping some of the displayed items including grouped items based on a selected category specific attribute upon receiving a grouping command so that the grouped items are displayed in a single row;
expanding the grouped items upon receiving an expand command so that the grouped items are each displayed in a separate row; and
removing a column corresponding to a category specific attribute of the items from the display upon receiving a column remove command.

12. A method comprising:
searching an electronic catalog for items that meet a criteria identified in a received request;
displaying a list of items identified in the search;
displaying a plurality of attributes for each item and values for the plurality of attributes of each item;
receiving a selection of one of the displayed attributes;
consolidating at least two of the displayed items based on the selected attribute;
displaying the consolidated items as a single item.

13. The method of claim 12, further comprising displaying a count of the consolidated items that are displayed as a single item in association with the displayed single item.

14. The method of claim 12, further comprising displaying the values for a second attribute of the consolidated items by displaying a range for the attribute values.

15. The method of claim 12, further comprising, after consolidating, receiving a selection of a second one of the displayed attributes, further consolidating at least two of the displayed items based on the second selected attribute, and displaying the further consolidated items as a single item.

16. The method of claim 12, wherein consolidating comprises comparing the values for the selected attribute for at least two of the items and combining items that have the same value for the attribute into a single consolidated item.

17. The method of claim 12, further comprising receiving a selection of a range of values, and wherein consolidating comprises comparing the values for the selected attribute for at least two of the items and combining items that have an attribute value within the selected range into a single consolidated item.

18. The method of claim 12, further comprising removing all of the items from the display except for the consolidated items and displaying the consolidated items as separate items.

19. The method of claim 12, further comprising receiving a selection of an attribute of the displayed items and removing the attribute and the values of the attributes from the display.

20. The method of claim 12, wherein receiving a selection comprises receiving a selection through a user interface.

21. The method of claim 12, further comprising:
receiving a selection of a category corresponding to at least one of the items;
displaying values for the at least one item for attributes related specifically to items of the selected category;
receiving a selection of a category specific attribute; and
consolidating at least two of the displayed items of the selected category based on the selected attribute.

22. The method of claim 21, further comprising removing all of the items from the display except for items of the selected category.

23. A machine-readable medium having stored thereon data representing instructions which, when executed by a machine, cause the machine to perform operations comprising:
searching an electronic catalog for items that meet a criteria identified in a received request;
displaying a list of items identified in the search;
displaying a plurality of attributes for each item and values for the plurality of attributes of each item;
receiving a selection of one of the displayed attributes;
consolidating at least two of the displayed items based on the selected attribute;
displaying the consolidated items as a single item.

24. The medium of claim 23, further comprising instructions which, when executed by the machine, cause the machine to perform further operations comprising displaying a count of the consolidated items that are displayed as a single item in association with the displayed single item.

25. The medium of claim 23, further comprising instructions which, when executed by the machine, cause the machine to perform further operations comprising, after consolidating, receiving a selection of a second one of the displayed attributes, further consolidating at least some of the displayed items based on the second selected attribute, and displaying the further consolidated items as a single item.

26. The medium of claim 23, wherein the instructions for consolidating comprise instructions which, when executed by the machine, cause the machine to perform further operations comprising comparing the values for the selected attribute for at least two of the items and combining items that have the same value for the attribute into a single consolidated item.

27. The medium of claim 23, further comprising instructions which, when executed by the machine, cause the machine to perform further operations comprising removing all of the items from the display except for the consolidated items and displaying the consolidated items as separate items.

28. The medium of claim 23, further comprising instructions which, when executed by the machine, cause the machine to perform further operations comprising:
receiving a selection of a category corresponding to at least one of the items;
displaying values for the at least one item for attributes related specifically to items of the selected category;
receiving a selection of a category specific attribute; and
consolidating at least two of the displayed items of the selected category based on the selected attribute.

29. An apparatus comprising:
a display to present a list of items, a plurality of attributes for each item, and values for the plurality of attributes of each item, the list of items generated from an electronic catalog and corresponding to items identified in response to a received request;
a user interface to receive a selection of one of the displayed attributes; and
a processor to consolidate at least two of the displayed items based on the selected attribute for display as a single item.

30. The apparatus of claim 29, wherein the processor determines a count of the consolidated items for display in association with the displayed single item.

31. The apparatus of claim 29, wherein the processor further consolidates at least two of the displayed items including consolidated items based on a second attribute selection received from the user interface and provides the further consolidated items to be presented as single items on the display.

32. The apparatus of claim 29, wherein the processor consolidates by comparing the values for the selected attribute for at least two of the items and combining items that have the same value for the attribute into a single consolidated item.

33. The apparatus of claim 29, wherein the processor consolidates by comparing the values for the selected attribute for at least two of the items and combining items that have an attribute value within a range into a single consolidated item.

34. The apparatus of claim 29, wherein the processor removes all of the items from the display except for the consolidated items and displaying the consolidated items as separate items upon receiving a remove command from the user interface.

* * * * *